United States Patent [19]

Rich

[11] Patent Number: 4,754,885
[45] Date of Patent: Jul. 5, 1988

[54] KNOCKDOWN MOBILE FORMS CART

[76] Inventor: Beverly C. Rich, 1310 Maywood Ave., Ruxton, Md. 21204

[21] Appl. No.: 863,793

[22] Filed: May 16, 1986

[51] Int. Cl.4 .............................................. A47F 5/00
[52] U.S. Cl. .................................... 211/181; 211/133; 248/188.9; 280/79.3
[58] Field of Search ............... 211/181, 194, 188, 132, 211/133, 126; 248/188.8, 188.9; 16/35 R; 280/47.35, 47.34, 79.3

[56] References Cited

U.S. PATENT DOCUMENTS

| | | | |
|---|---|---|---|
| 3,502,225 | 3/1970 | Oliver | 211/181 X |
| 3,606,025 | 9/1971 | Wilson | 211/126 |
| 4,333,207 | 6/1982 | Atwood | 16/35 R |
| 4,616,756 | 10/1986 | Holtz | 280/47.35 X |

FOREIGN PATENT DOCUMENTS

| | | | |
|---|---|---|---|
| 572165 | 11/1958 | Belgium | 211/126 |
| 909033 | 10/1962 | United Kingdom | 211/126 |
| 934679 | 8/1963 | United Kingdom | 211/126 |
| 963516 | 7/1964 | United Kingdom | 211/126 |

Primary Examiner—Robert W. Gibson, Jr.
Attorney, Agent, or Firm—Walter G. Finch

[57] ABSTRACT

A knockdown mobile forms cart is provided which requires no tools to assemble or disassemble. The cart is assembled from welded and chrome plated steel wire components including a base, side pieces and a tray having folding end pieces. Stacking trays allow two or more trays to be supported by a single base. The components interlock, resulting in a rigid structure. Casters are also provided.

24 Claims, 2 Drawing Sheets

KNOCKDOWN MOBILE FORMS CART

BACKGROUND OF THE INVENTION

High speed printers driven by microprocessors are capable of generating huge quantities of routine office paperwork. The task is simplified by printing on long perforated sheets of paper, separable into individual forms or pages. Such sheets are normally folded into a stack having the width and depth of the individual pages and whose height is determined by the number of pages in the sheet. Handling such stacks includes storing, transporting unprinted stacks, maintaining a stack so that it can be fed into a printer, receiving printed stacks from the printers and transporting printed stacks to other work stations. Having considered long felt needs, esthetic and the aforementioned functional requirements, the knockdown mobile forms cart is offered as a contribution to the modern office.

SUMMARY OF THE PRESENT INVENTION

Thus, it is an object of the present invention to provide a forms cart that is mobile.

It is another object of the present invention to provide a forms cart which is rugged yet compact and esthetically pleasing.

It is yet another object of the present invention to provide a form cart which may be assembled and disassembled without tools for shipping or for storage.

Accordingly a mobile forms cart is provided having casters and a stand alone base. Removable upright sidepieces connect the base to a detachable shelf-like tray. The tray has two folding end pieces. One of the end pieces has a handle. Both may serve as a paper guide. No tools are required in assembly or disassembly.

DESCRIPTION OF THE PREFERRED EMBODIMENT

An ideal material for the construction of a mobile forms cart is chrome plated steel wire. Such a material is durable, rigid, corrosion resistant, attractive and is smooth. In addition the resilient qualities and strength of the steel allow a design which is very sturdy when used and yet can be assembled and disassembled without tools.

Figure 1:
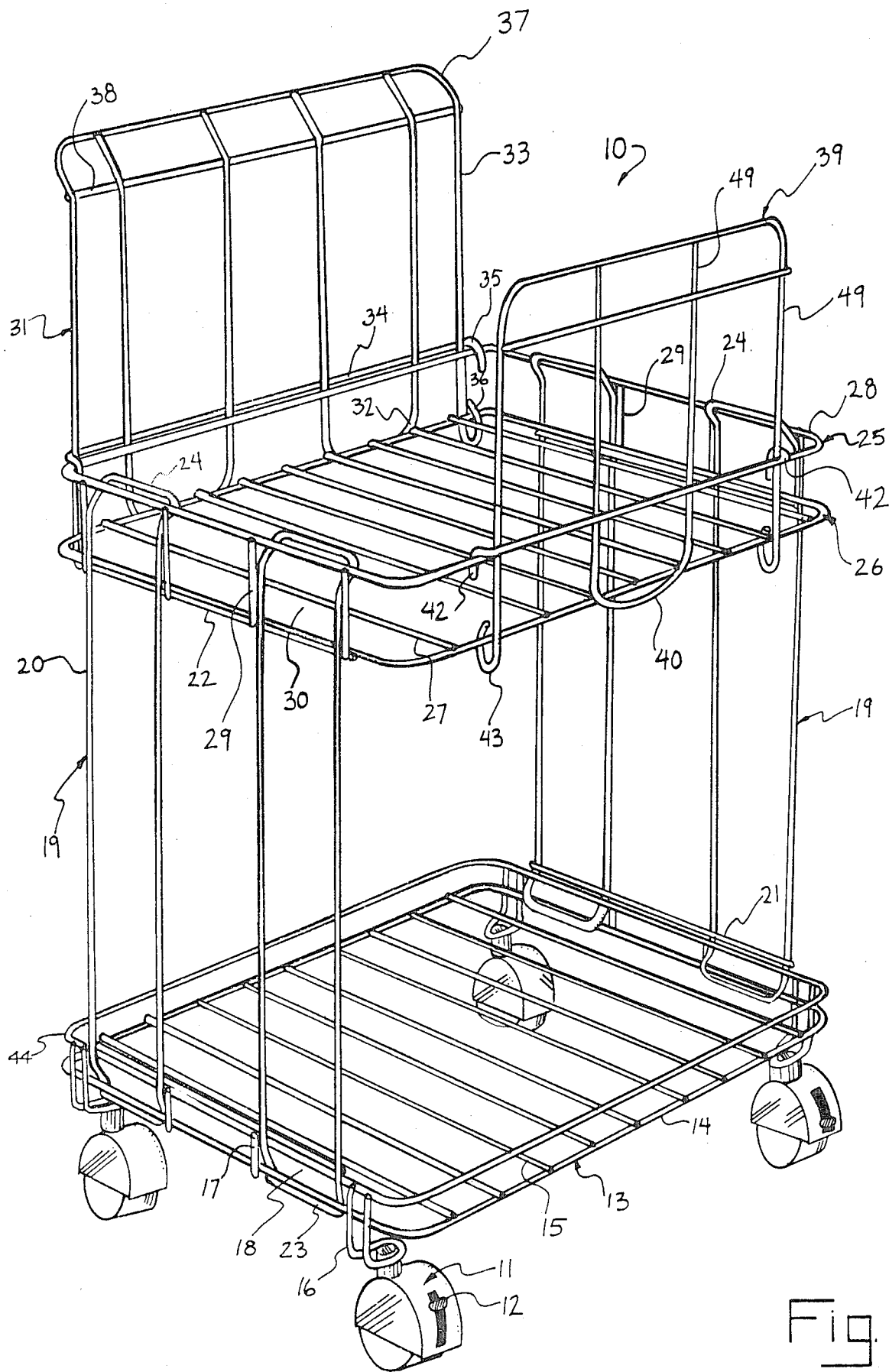
FIG. 1 is a perspective view of the mobile forms cart.

FIG. 1 shows a knockdown mobile forms cart 10 fabricated from chrome plated steel wire. Swivel casters 11 with brakes 12 allow the cart to be moved about or parked in a particular position. Caster supports 16 hold the caster in place and serve as upright supports to a stand alone base 13. The base may be used by itself or as part of a complete forms cart. The base has a bottom rack 14 including base cross pieces 15 welded in place. Caster supports and intermediate uprights 17 support a base top wire 44. A slot 18 is formed in the base by having an intermediate upright 17 on one side of the slot, a caster support 16 on the other side, a base top wire 44 on the top of the slot, and the base bottom on the bottom of the slot. FIG. 1 shows a cart having three slots on each of two sides. Two slots on each side are for receiving sidepieces 19.

Figure 2:
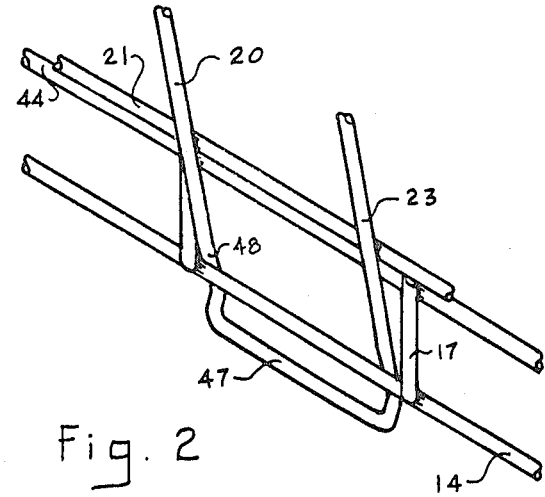
FIG. 2 is a perspective detail view of one of the lower tongues as it is inserted in one of the slots in the base.

The slots are adapted to receive bottom tongues 23 formed in the side pieces 19. In assembling the cart, the tongue of the removable sidepiece is inserted through the slot. This is shown in FIG. 2. The sidepiece is then rotated about the slot into a vertical position. When vertical, the bottom of the tongue 47 through friction resists the upward vertical translation of the sidepiece owing to the curved portion of the tongue 48, friction, and the resilience of the material. A stabilizer 21 is joined to the sidepiece uprights 20. The stabilizer transmits load and resists downward vertical translation of the sidepieces because it abuts the base top wire 44. The stabilizer also rigidizes the sidepieces because it connects the uprights 20. A snug fitting tongue and stabilizer also resists bending of the uprights 20 in the plane of the sidepiece.

Referring again to FIG. 1, a top tongue 24, stabilizer 22 and slot 30, similar to those of the base, support a removable tray 25. The tray "locks" in place owing to the outward opposing forces exerted by the two sidepieces. The tray stabilizer 22 also helps support the load imposed by the tray 25 and its contents. The tray has a bottom 26 with various cross pieces 27 spanning the bottom and welded to it. Top uprights 29 support an upper wire 28 and define the sides of the slots 30.

Figure 3:
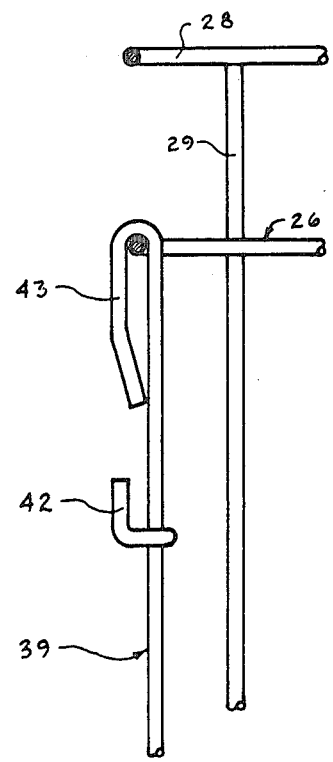
FIG. 3 is a detail of the folding end piece showing the elongated loop and retainer.

The tray has two folding folding sides 31 and 39. One side 31 has a bent handle 37. Either side may serve as a guide over which paper can be fed because of the absence of sharp edges and the smooth finish of the chrome plated steel. The sides fold from a suspended position to upright and locked positions. FIG. 3 shows a detail of one of the folding sides 39 in the suspended position. The folding sides hangs by an extended loop 43 from the tray bottom 26. It may be rotated into the upright position. From the upright position it may be lowered into the locked position shown in FIG. 1. A retainer 42 holds and locks the folding side in place. The retainer also spans and connects the end uprights 49. Seen more clearly in FIG. 1, two of the uprights in the folding side 39 form a U-shaped spring 40. The U-shaped spring cooperates with the retainer 42 for holding the side 39 in place. The folding side having the handle is shown in FIG. 1 as having two such U-shaped springs. This folding side also has a brace 38.

Figure 4:
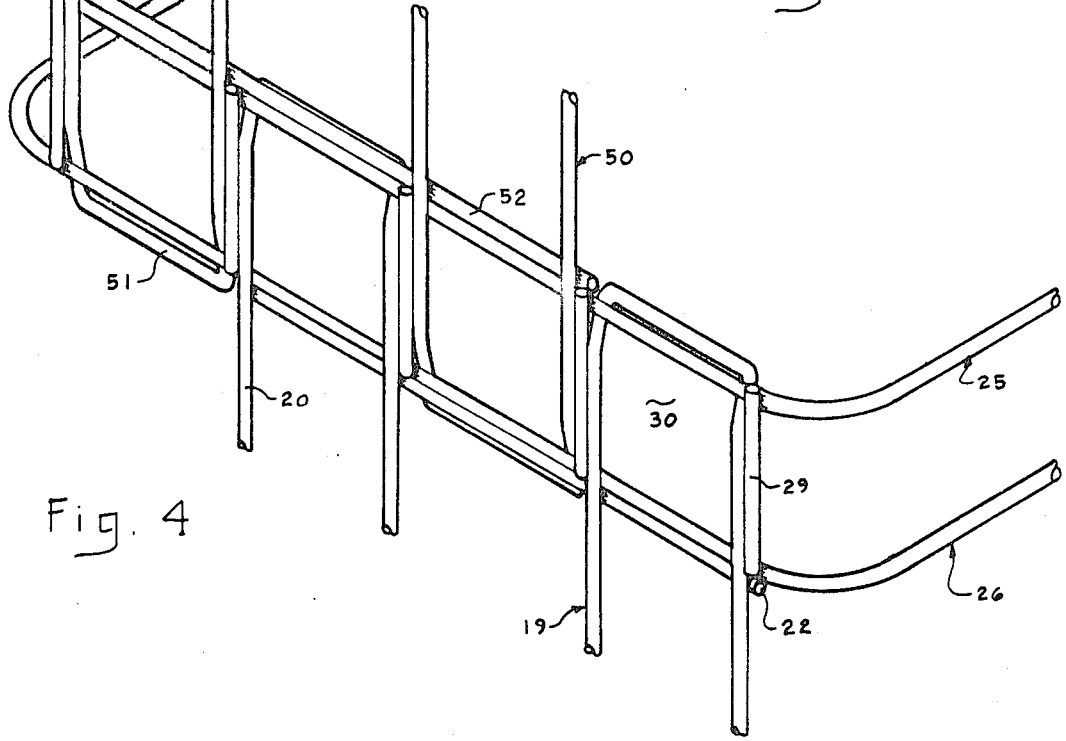
FIG. 4 shows in perspective, how a plurality of trays may be stacked in a single forms cart.

The knockdown mobile forms cart can be made to stack. FIG. 4 shows a tray having four slots 30 and five uprights 29. In this way an auxiliary sidepiece 50 may connect between trays so that a forms cart may have two or more trays and a base. The tongues 51 of the auxiliary sidepiece are similar to the tongues of the sidepiece. The auxiliary sidepiece also has a stabilizer 52. Hence all the auxiliary sidepieces are the same and if the dimensions of the base slots 18 are the same as the dimensions of the tray slots then the auxiliary sidepieces and the sidepieces may be interchangeable.

It follows that the folding sides may be left in the upright position, folded down for loading and unloading the tray, or folded under the tray for shipping or storage. When fully assembled the knockdown mobile forms cart is remarkably light in weight, rigid and will support a large quantity of paper or other supplies. The surface is attractive, resists corrosion and is well adapted to paper feeding because it is smooth. The casters allow the cart to be easily moved over carpet or hard flooring even when the cart is fully loaded. When disassembled, the cart is compact.

A knockdown forms cart may have stacking trays. Two or more trays may be used in conjunction with a single base. Auxiliary trays may have or may lack folding ends as the individual use requires.

It will be appreciated that various modification to the disclosed knockdown mobile forms cart may be practiced without departing from the substance of the present invention.

What is claimed is:

1. A knockdown forms cart, comprising, a stand alone base, a removable tray positioned above and spaced from said stand alone base and contiguous therewith, removable oppositely positioned interlocking sides having bottom tongues adapted to interlock with said stand alone base and top tongues adapted to interlock with said removable tray, and additionally folding sides adapted to interlock with said removable tray and arranged transversely to said removable oppositely positioned interlocking sides of said cart.

2. A knockdown forms cart as recited in claim 1, additionally integral caster supports for supporting said stand alone base, a bottom rack for said base, intermediate uprights for said sides, a top wire supported above said base and supported by said caster supports, and a plurality of slots positioned between said top wire and said stand alone base.

3. A knockdown forms cart as recited in claim 2, said removable oppositely positioned interlocking sides each comprising one or more pairs of resilient uprights having opposite ends, each pair of resilient uprights having formed therein an integral tongue and stabilizer at each said end.

4. A knockdown forms cart as recited in claim 2, each oppositely positioned interlocking side comprises a plurality of uprights having integrally formed therein at least one U-shaped spring, an elongated loop and a retainer.

5. A knockdown forms cart as recited in claim 4, wherein said uprights are adapted to rotate approximately 270 degrees about said elongated loop, from a locked position to a storage position.

6. A knockdown forms cart as recited in claim 5, wherein at least one end of each said upright has an integral handle formed therein and the same each said end is adapted to serve as a paper guide.

7. A knockdown forms cart, comprising, at least one paper guide, said paper guide being formed integrally with a folding end piece having a retainer, a U-shaped spring and an elongated loop, a stand alone base, a tray with removable interlocking sides having at least one or more pairs of resilient uprights adapted to be positioned between said stand alone base and said tray, each pair of resilient uprights having a top integral tongue and a top stabilizer, a bottom integral tongue, and a bottom tongue stabilizer, said bottom integral tongue being adapted to interlock with said stand alone base, said tray having a plurality of slots, said slots in said tray being adapted to interlock with said removable interlocking sides.

8. A knockdown forms cart as recited in claim 7, wherein said tray further comprises a bottom wire and a top wire, said bottom wire and top wire forming a plane, said U-shaped spring abutting said tray on one side of said plane, said retainer engaging said tray on the other side, said U-shaped spring exerting a force on said tray which is resisted by said retainer.

9. A knockdown forms cart as recited in claim 8, wherein said top stabilizer cooperates with said tray and said bottom stabilizer cooperates with said base.

10. A knockdown forms cart as recited in claim 9, wherein each removable side comprises two pairs of uprights, with the uprights of each side being connected by the respective top stabilizer and bottom stabilizer.

11. A knockdown forms cart as recited in claim 10, wherein said tongue has a curved portion formed therein.

12. A knockdown forms cart as recited in claim 12, wherein said tray has two folding ends, one folding end comprising six uprights, two U-shaped springs, an integral handle, and a brace, the other folding end comprising four uprights and one U-shaped spring.

13. A knockdown mobile forms cart comprising, a stand alone base having a top wire and four braked casters, caster supports, for rotatably retaining said casters, said caster supports supporting said top wire, a base having base uprights and a plurality of slots formed therein, said slots being defined by the space intermediate said caster supports and said base uprights.

14. A knockdown mobile forms cart as recited in claim 13, said knockdown mobile forms cart further comprises a tray having tray slots, a tongue integrally formed on a resilient side piece, said slots in said base being adapted to receive said tongue integrally formed on said resilient side piece, a side piece having two bottom tongues, two top tongues adapted to engage said slots in said tray, a bottom stabilizer and a top stabilizer, said side piece in said resilient side piece being adapted to bend in the middle thereby facilitating engagement of the various tongues and slots.

15. The knockdown mobile forms cart as recited in claim 14, wherein said tray comprises at least one folding end, said at least one folding end further comprising one or more U-shaped springs, an elongated loop and a retainer, said at least one folding end having an integral handle formed therein.

16. A knockdown mobile forms cart as recited in claim 14, wherein said base, tray, sides and ends are formed in their entirety from plated steel wire.

17. A knockdown mobile forms cart, comprising, a stand alone base, removable interlocking sidepieces adapted to be received by said stand alone base, two or more stacking trays, two or more auxiliary sidepieces adapted to interlock between said trays said sidepieces and auxiliary sidepieces having tongues and stabilizers, and at least one tray having one or more folding ends.

18. A knockdown mobile forms cart as recited in claim 17, wherein all of said trays have eight slots each, with said slots being formed by adjacent uprights.

19. A knockdown forms mobile vehicle, comprising, a stand alone base, removable interlocking sides each having upper and lower tongues, said stand alone base being adapted to receive said removable interlocking sides, a removable tray, the lower bottom tongues of said sides being adapted to interlock with said stand alone base and the upper tongues of said sides being adapted to interlock with said removable tray, said removable tray having one or more folding ends.

20. A knockdown forms mobile vehicle as recited in claim 19, wherein said stand alone base further comprises integral caster supports, a bottom rack, intermediate uprights, a base top wire and a plurality of slots.

21. A knockdown forms mobile vehicle as recited in claim 19, wherein said removable interlocking sides each comprise one or more pairs of resilient uprights having two ends, each pair having formed therein an integral tongue and stabilizer at each end.

22. A knockdown forms mobile vehicle as recited in claim 21, wherein said folding end comprises a plurality of uprights, said folding end having integrally formed therein at least one U-shaped spring, an elongated loop and a retainer.

23. A knockdown mobile forms vehicle, comprising, a stand alone base, removable interlocking sidepieces adapted to be received by said stand alone base, two or more stacking trays, two or more auxiliary sidepieces adapted to interlock between said trays, said sidepieces and auxiliary sidepieces having tongues and stabilizers, at least one said tray having one or more folding ends.

24. A knockdown mobile forms vehicle as recited in claim 23, wherein all of said trays have eight slots each, with said slots being formed by adjacent uprights.

* * * * *